(12) United States Patent
Farahati et al.

(10) Patent No.: US 7,837,564 B2
(45) Date of Patent: Nov. 23, 2010

(54) MULTI-PIECE DRIVE PLATE FOR A HYDRAULIC TORQUE CONVERTER

(75) Inventors: Rashid Farahati, Copley, OH (US); Adam Uhler, Sterling, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 222 days.

(21) Appl. No.: 11/642,103

(22) Filed: Dec. 20, 2006

(65) Prior Publication Data

US 2007/0149295 A1   Jun. 28, 2007

Related U.S. Application Data

(60) Provisional application No. 60/753,130, filed on Dec. 22, 2005.

(51) Int. Cl.
*F16D 3/62* (2006.01)
(52) U.S. Cl. .................. 464/69; 464/84; 192/70.18
(58) Field of Classification Search ............ 464/81, 464/84, 98, 99, 69, 100, 101; 403/326, 329, 403/220; 192/70.18, 200, 3.29; 267/158, 267/160, 161
See application file for complete search history.

(56) References Cited

U.S. PATENT DOCUMENTS

| | | | | |
|---|---|---|---|---|
| 1,013,786 A | * | 1/1912 | Lambert | 464/69 |
| 2,821,071 A | * | 1/1958 | Tetlow | 464/69 |
| 2,858,681 A | * | 11/1958 | Smirl et al. | 464/84 X |
| 4,325,650 A | * | 4/1982 | Masai | 267/161 X |
| 4,689,953 A | * | 9/1987 | Wang | 464/100 X |
| 5,566,803 A | * | 10/1996 | Lindner et al. | 192/70.17 |
| 5,944,158 A | * | 8/1999 | Okazaki | |
| 6,216,837 B1 | | 4/2001 | Maienschein et al. | |
| 6,361,240 B1 | * | 3/2002 | Kriz et al. | 403/287 |
| 6,585,091 B2 | * | 7/2003 | Reinhart et al. | 192/3.28 |
| 6,830,140 B2 | * | 12/2004 | Zink et al. | 192/48.9 |
| 7,662,043 B2 | * | 2/2010 | Schmid et al. | 464/99 |
| 2002/0070089 A1 | * | 6/2002 | Dorfler et al. | 192/70.18 |

* cited by examiner

*Primary Examiner*—Greg Binda
(74) *Attorney, Agent, or Firm*—Simpson & Simpson, PLLC

(57) ABSTRACT

A drive plate for a torque converter including first and second plates operatively arranged to be attached to a torque converter and a drive unit. In another embodiment, each of the first and second plates further includes at least one first opening and at least one second opening operatively arranged to receive a first and second fastener, respectively. In yet another embodiment, the drive plate includes a plurality of component plates operatively arranged to be attached to a torque converter and a drive unit.

6 Claims, 10 Drawing Sheets

PRIOR ART

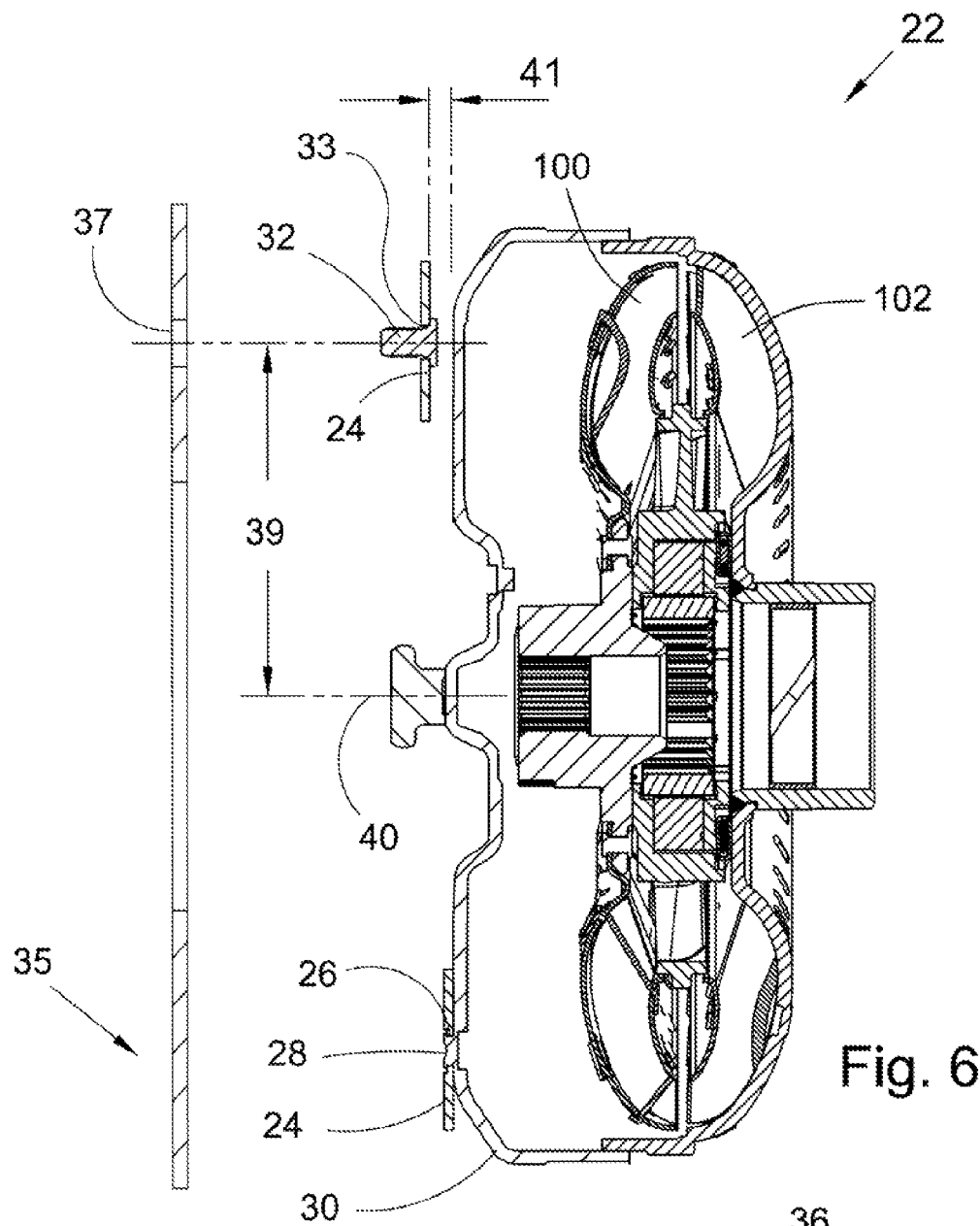
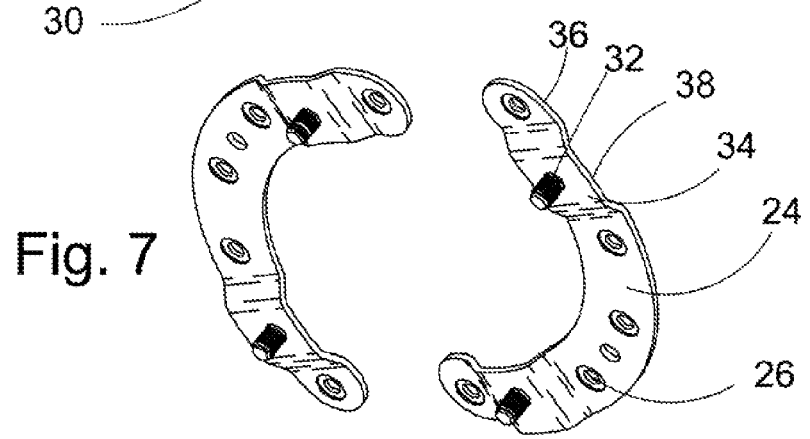
Fig. 6
Fig. 7

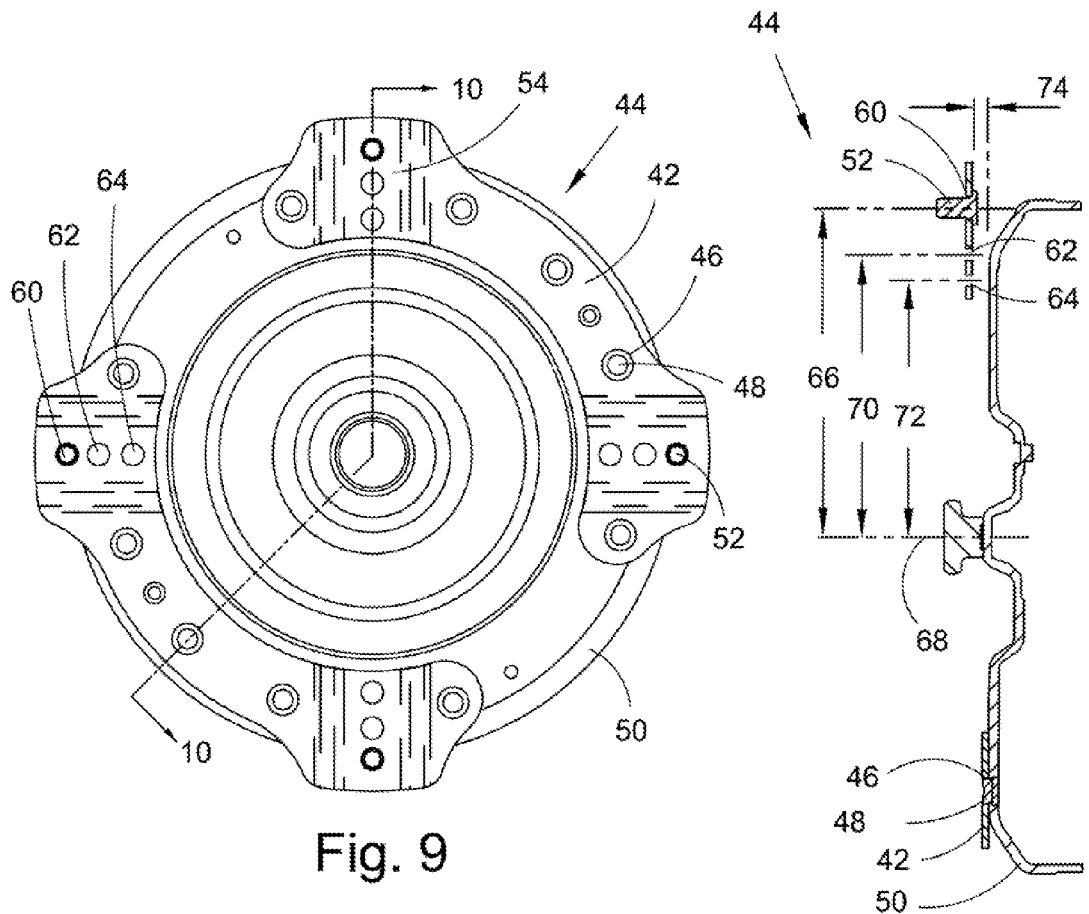
Fig. 9
Fig. 10
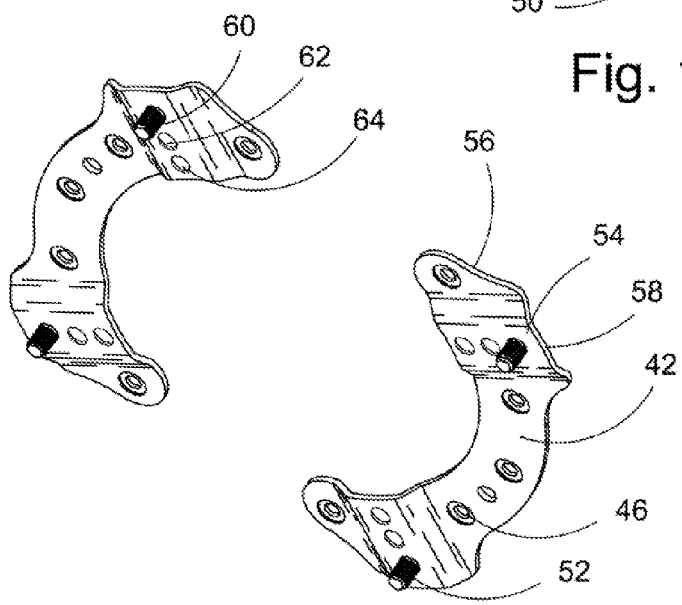
Fig. 11

MULTI-PIECE DRIVE PLATE FOR A HYDRAULIC TORQUE CONVERTER

CROSS REFERENCE TO RELATED APPLICATIONS

This patent application claims the benefit under 35 U.S.C. §119(e) of U.S. Provisional Application No. 60/753,130, filed Dec. 22, 2005, which application is incorporated herein by reference.

FIELD OF THE INVENTION

The present invention relates generally to torque converters, more particularly, to a torque converter drive plate, and, more specifically, to a multi-piece torque converter drive plate.

BACKGROUND

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, includes three primary components, an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

Although coupling the impeller to the engine, at first glance, may appear trivial, the means by which the coupling is accomplished can radically effect the performance and efficiency of the engine and torque converter, e.g., resulting in varying horsepower at the wheels. The push for increased fuel economy/gas mileage and decreased manufacturing costs encouraged the development of torque converter drive plates having various configurations. For example, in one design, tabs or extensions are forged or welded on a torque converter cover, thereby providing an integral means of coupling a converter to an engine. Although this design may be quite simple, it does however introduce a significant amount of dense material to the torque converter assembly, and consequently introduces a significant mass to the assembly.

As the torque converter must rotate in order to transfer torque between the engine and the transmission, any added mass to the torque converter must also be rotated during this transfer process. Due to the principle of mass moment of inertia, i.e., a measure of a solid object's resistance to changes in rotational speed about its rotational axis, it can be shown mathematically that an object having a greater mass will have a greater mass moment of inertia. The mass moment of inertia I for a torque converter can be approximated by the following formula used for a thin disk having a radius r and a mass m:

$$I = \frac{mr^2}{2}$$

Thus it can be seen that I is directly proportional to m, and therefore as m increases, I also increases. In view of this relationship between resistance to rotation, i.e., the amount of power required by the engine to drive the torque converter, and the mass of the object rotating, the resistance to rotation may be decreased by removing mass from the torque converter.

One design which reduces the mass of the torque converter assembly is shown in the embodiment depicted in FIG. 1, i.e., a single stamped drive plate. In this design, the large mass of the welded or forged tabs is replaced by the reduced mass of the stamped plate. A secondary benefit of the single piece drive plate is the reduced cost of stamping operations verses the higher cost of forging or welding operations. Thus, the single stamped plate of FIG. 1 provides both a manufacturing cost savings as well as a mass reduction over the welded and/or forged tabs. However, the single plate design requires a significant amount of material for each stamping, i.e., a large amount of material for a drive plate and scrap material from the central region of the plate. Additionally, due to overall part size, a limited number of drive plates may be produced from a given length of sheet metal stock (see FIG. 10).

As can be derived from the variety of devices and methods directed at providing means to couple a torque converter to an engine, many means have been contemplated to accomplish the desired end, i.e., strong, reliable coupling, without sacrificing mass moment of inertia, and thus resulting in higher fuel efficiency and performance. Heretofore, tradeoffs between strength and reliability of coupling means and material mass for such means were required. Thus, there has been a longfelt need for a torque converter drive plate having high strength and reliability, while introducing a minimal mass to the overall torque converter assembly.

BRIEF SUMMARY OF THE INVENTION

The present invention broadly includes a torque converter drive plate having a first and second plate. In one embodiment, the first and second drive plates are operatively arranged to be secured to a torque converter. In another embodiment, each of the first and second plates further includes at least one first opening arranged to receive a first fastener, and at least one second opening arranged to receive a second fastener. In various embodiments, the first fastener may include a rivet, a first bolt, a weld or other fastening means known in the art. In other embodiments, the second fastener may include a stud, a lug, a second bolt or other coupling means known in the art.

In yet another embodiment, the torque converter drive plate includes a plurality of component plates operatively arranged to be fixedly secured to a torque converter. In this embodiment, each plate in the plurality of component plates further includes at least one first opening and at least one second opening, wherein each first opening is operatively arranged to receive a first fastener and each second opening is operatively arranged to receive a second fastener.

A general object of the invention is to provide means to couple an engine and a torque converter.

Another object of the invention is to minimize the mass of a torque converter assembly.

Yet another object of the invention is to minimize material losses during manufacture of a torque converter drive plate.

These and other objects, features, and advantages of the present invention will become readily apparent to one having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 6 is a cross sectional view of the torque converter cover of FIG. 4 taken generally along line 6-6 in FIG. 5;

FIG. 7 is a perspective view of the torque converter drive plate of FIG. 4 shown without the torque converter;

FIG. 9 a front elevational view of the torque converter cover of FIG. 8;

FIG. 10 is a cross sectional view of the torque converter cover of FIG. 8 taken generally along line 10-10 in FIG. 9;

FIG. 11 is a perspective view of the torque converter drive plate of FIG. 8 shown without the torque converter;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the preferred embodiment.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
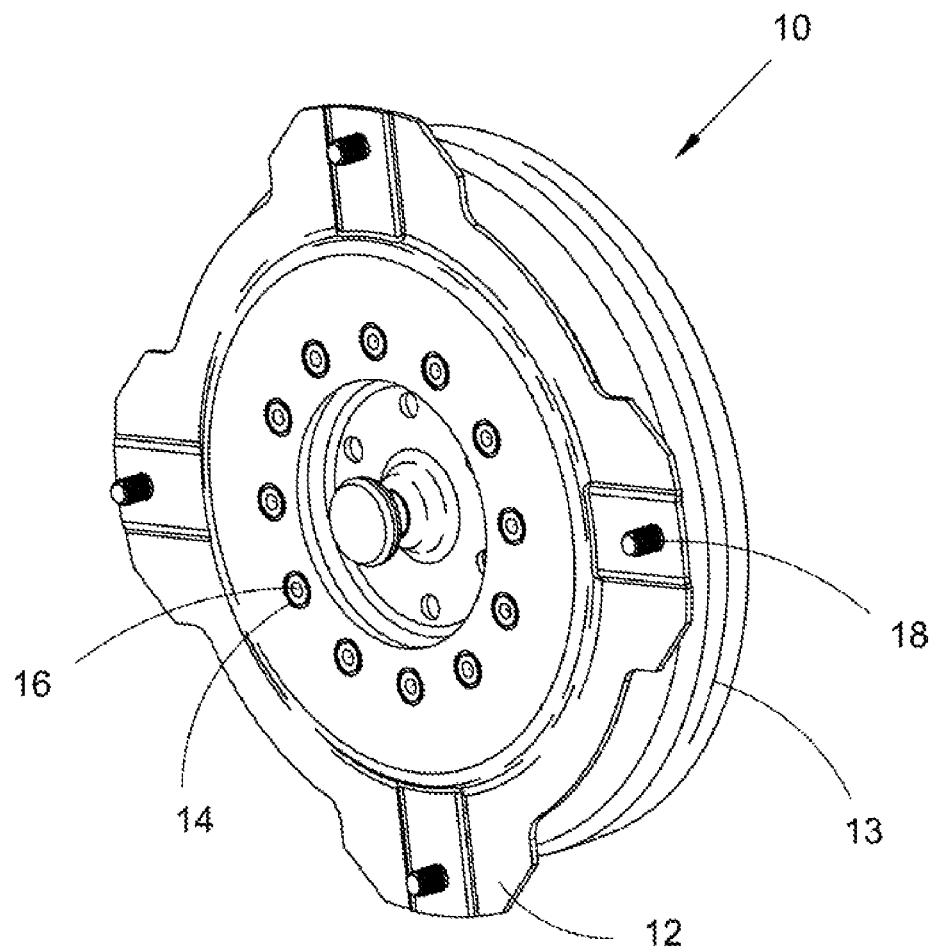
FIG. 1 is a perspective view of a torque converter cover including a prior art torque converter drive plate.
Figures 2, 3:
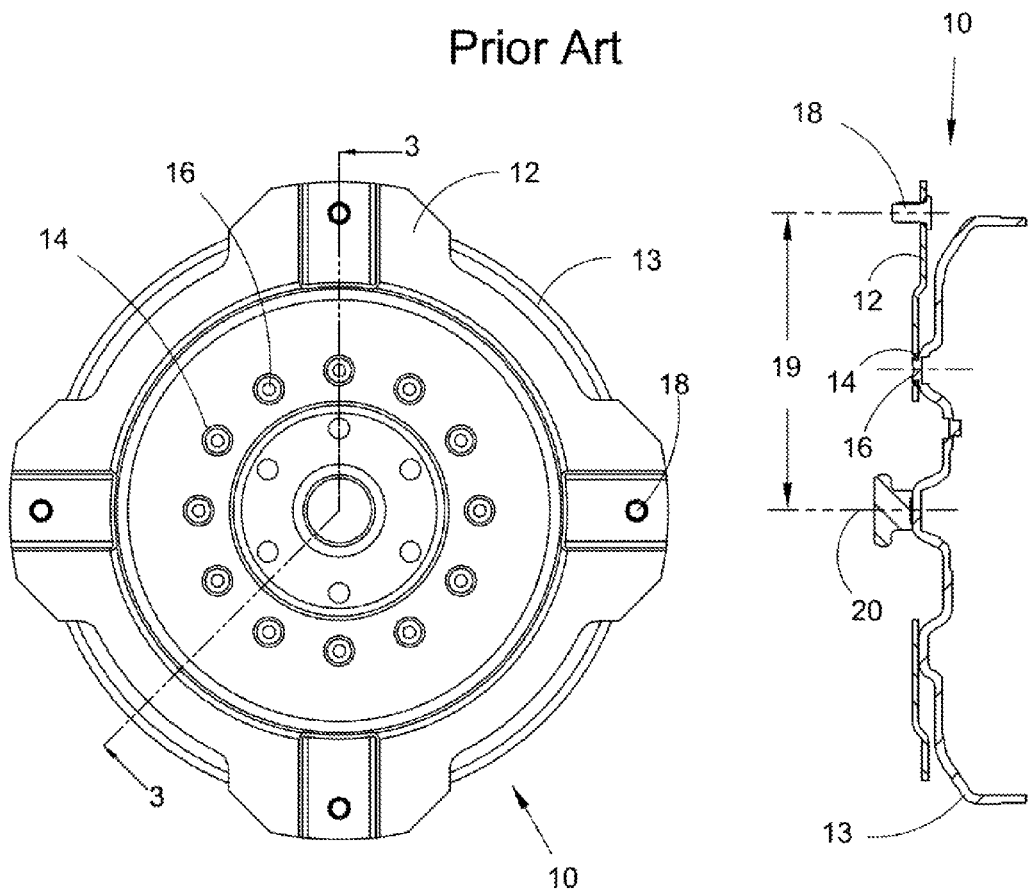
FIG. 2 is a front elevational view of the torque converter cover of FIG. 1.
FIG. 3 is a cross sectional view of the torque converter cover of FIG. 1 taken generally along line 3-3 in FIG. 2.

Adverting now to the figures, FIGS. 1 through 3 show torque converter cover 10 including prior art torque converter drive plate 12 wherein FIG. 1 shows a perspective view of torque converter cover 10, FIG. 2 is a front elevational view of torque converter cover 10, and FIG. 3 is a cross sectional view of torque converter cover 10 taken generally along line 3-3 in FIG. 2. Torque converter cover 10 is enclosed by cover 13 and provides a surface to which drive plate 12 is attached. Drive plate 12 includes holes 14 wherein rivets 16 are disposed, thereby fixedly securing drive plate 12 to torque converter cover 10. Drive plate 12 further incorporates studs 18 disposed about a bolt circle complimentary to a bolt circle disposed about the engine flex plate (not shown). As described infra, drive plate 12 requires a significant amount of sheet metal stock to produce, and the circular region at the center of drive plate 12 is also lost as scrap.

As shown in FIG. 3, studs 18 are disposed at radius 19, wherein radius 19 is the distance between center of rotation 20 of torque converter cover 10 and the center of studs 18. Radius 19 is derived from the radius of torque converter cover 10 and the radius of the engine fly wheel (not shown). Various requirements, e.g., torque and size, determine the radius of torque converter cover 10, while the engine flex plate radius is likely determined by another design group. Thus, for each set of vehicle requirements, a unique radius 19 may be required, and therefore a unique drive plate 12.

Figure 4:
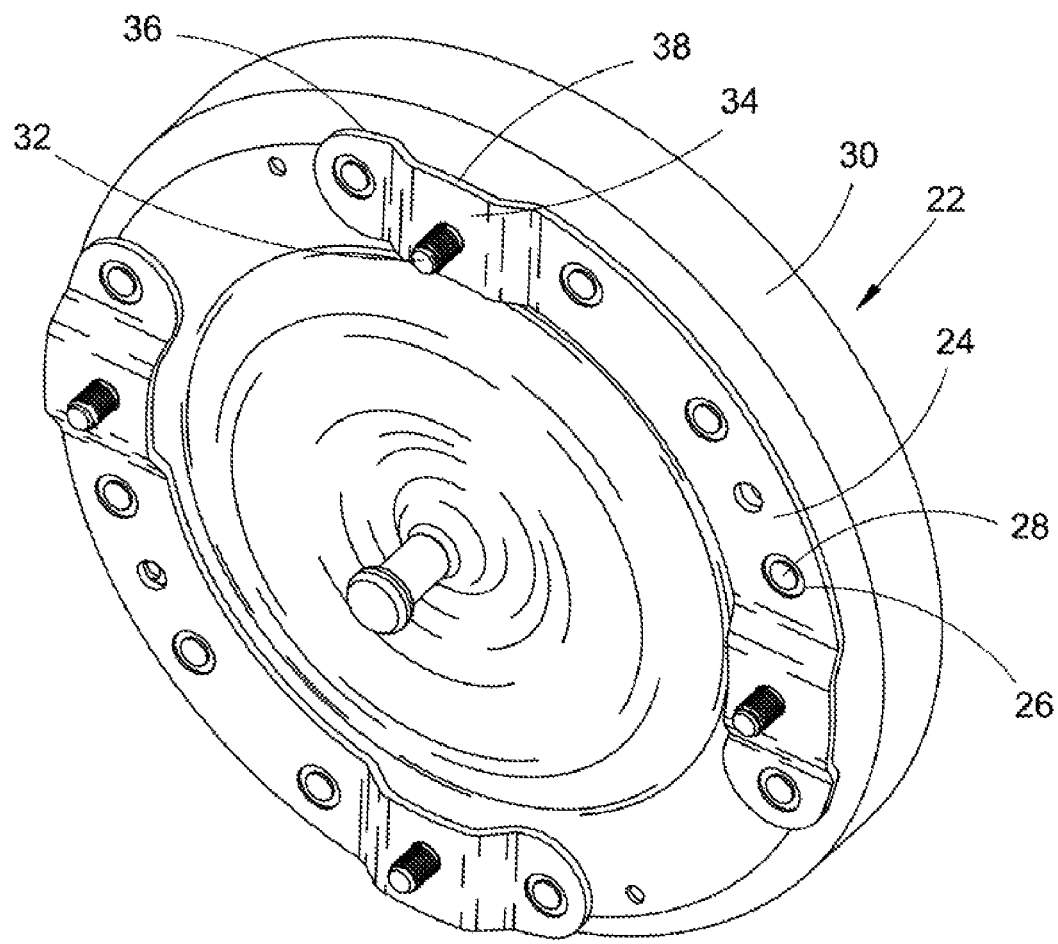
FIG. 4 is a perspective view of a torque converter cover including an embodiment of a torque converter drive plate of the present invention.
Figure 5:
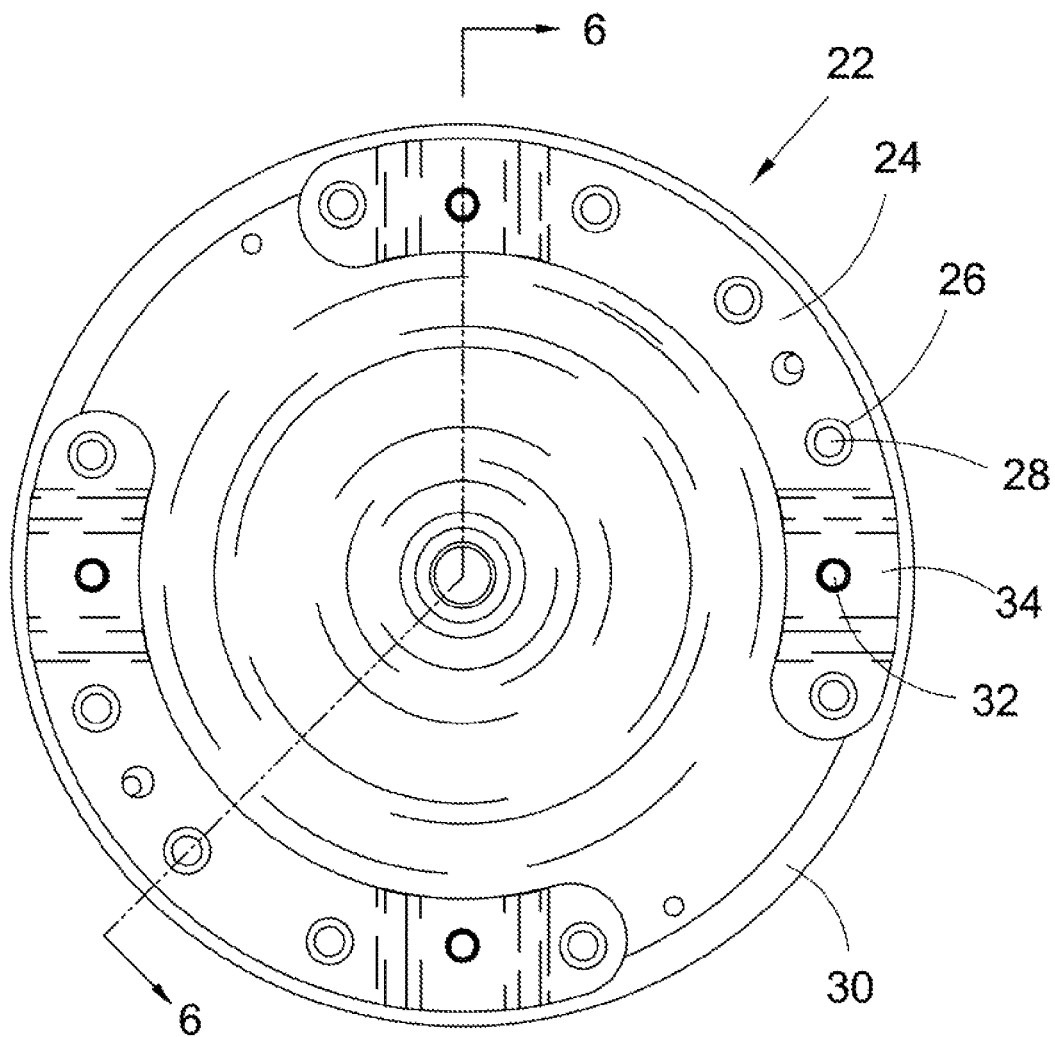
FIG. 5 is a front elevational view of the torque converter of FIG. 4.

FIGS. 4 through 7 show torque converter cover 22 including an embodiment of the instant invention, i.e., torque converter drive plates 24, wherein FIG. 4 is a perspective view of torque converter cover 22, FIG. 5 shows a front elevational view of torque converter 22 of FIG. 4, while FIG. 6 shows a cross sectional view of torque converter cover 22 taken generally along line 6-6 in FIG. 5, and lastly FIG. 7 shows a perspective view of torque converter drive plates 24. In the embodiments shown in these figures, torque converter drive plates 24 include holes 26 wherein rivets 28 are disposed, thereby fixedly securing drive plates 24 to cover 30 of torque converter 22.

As shown in FIG. 4, drive plates 24 may be fixedly secured to cover 30 with a plurality of rivets 28, however, as one of ordinary skill in the art would appreciate, other methods of fixedly securing drive plates 24 to cover 30 are also possible, e.g., bolts or welds, and such methods are within the spirit and scope of the invention as claimed. Drive plates 24 further include studs 32 disposed within raised portions 34 of drive plates 24. When torque converter cover 22 is installed in a vehicle (not shown), the distance between torque converter cover 22 and the engine flex plate (not shown) may vary. Thus, providing a means to easily modify the clearances becomes particularly important. As such, drive plates 24 are provided with raised portions 34, i.e., the distance between locating surface 36 and coupling surface 38, which portions may be varied dependant upon the specific requirements of the assembly, including having no raised portions 34. Additionally, this affords a torque converter developer the opportunity to design the converter based on the requirements of fluid dynamics, while still maintaining a simple means to couple the converter between the engine flex plate and the transmission.

FIG. 6 depicts studs, or bolts, 32 disposed in respective openings 33 at radius 39, wherein radius 39 is the distance between center of rotation 40 of torque converter 22 and the center of studs 32. Also shown in FIG. 6 are turbine 100 and pump 102. As described supra, radius 39 is derived from the radius of torque converter cover 22 and the radius of the engine fly wheel (not shown). Various requirements, e.g., torque and size, determine the radius of torque converter cover 22, while the engine flex plate radius is likely determined by another design group. Thus, for each set of vehicle requirements, a unique radius 39 may be required and therefore unique drive plates 24. Also shown in FIG. 6 is height 41, wherein height 41 is the distance between locating and coupling surfaces 36 and 38, respectively, of drive plates 24. Similar to the requirements of radius 39, height 41 is the result of the combination of design specifications, e.g., torque converter power or size, and flex plate dimensions, and therefore height 41 may vary with different configurations. In FIG. 6, flex plate 35 is shown. In one embodiment, studs 32 can be inserted through openings 37 in the flex plate to connect drive plates 24 to the flex plate. In one embodiment, rivets 28 are extruded from cover 30 as shown in FIG. 6.

Figure 8:
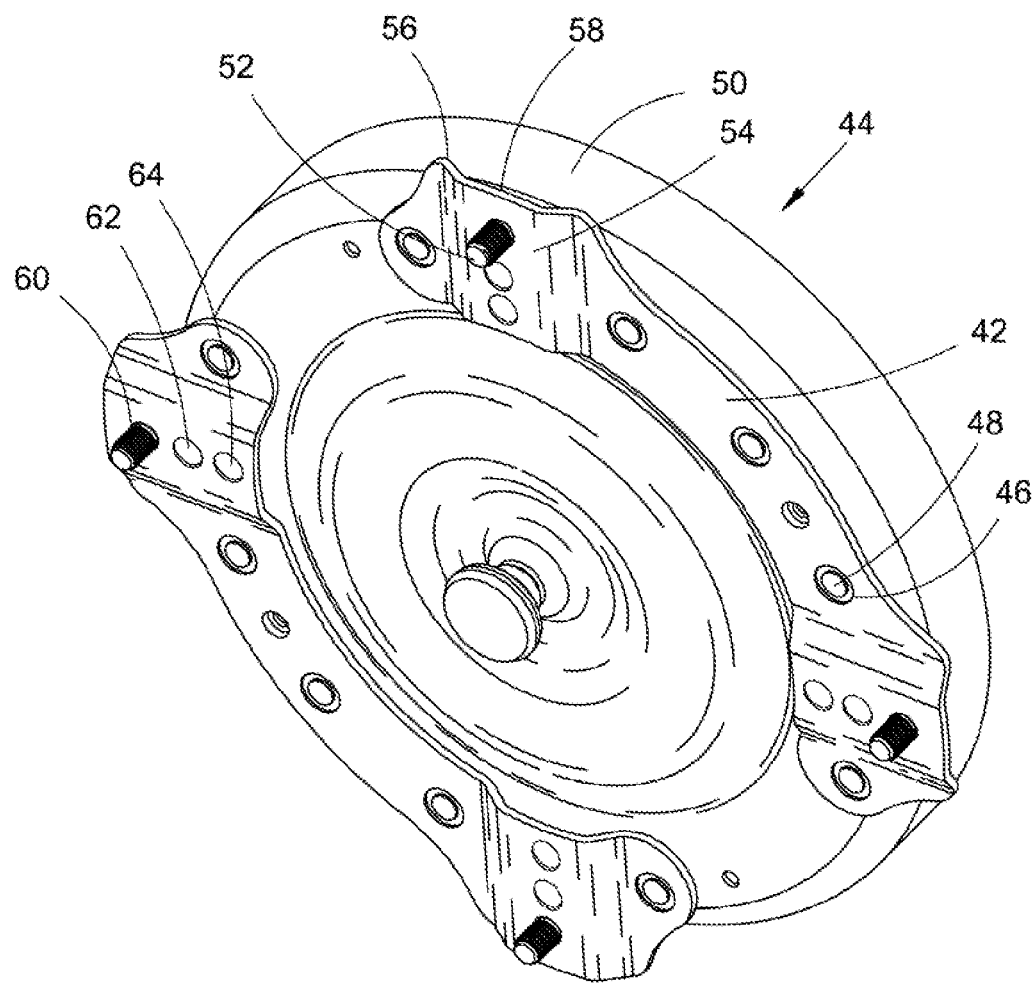
FIG. 8 is a perspective view of a torque converter cover including a second embodiment of a torque converter drive plate of the present invention.

FIGS. 8 through 11 show torque converter drive plates 42, wherein FIG. 8 is a perspective view of torque converter cover 44 including another embodiment of the instant invention, i.e., torque converter drive plates 42, FIG. 9 shows a front elevational view of torque converter cover 44 of FIG. 8, while FIG. 10 shows a cross sectional view of torque converter 44 taken generally along line 10-10 in FIG. 9, and lastly FIG. 11 shows a perspective view of torque converter drive plates 42. In the embodiments shown in these figures, torque converter drive plates 42 include holes 46 wherein rivets 48 are disposed, thereby fixedly securing drive plates 42 to cover 50 of torque converter cover 44.

Similar to the embodiment shown in FIGS. 4 through 7, drive plates 42 may be fixedly secured to cover 50 with a plurality of rivets 48, and as one of ordinary skill in the art would appreciate, other methods of fixedly securing drive plates 42 to cover 50 are also possible, e.g., bolts or welds, and such methods are within the spirit and scope of the invention as claimed. In like fashion, drive plates 42 further include studs 52 disposed within raised portions 54 of drive plates 42. When torque converter cover 44 is installed in various vehicles (not shown), the assembly likely has varying distance requirements between torque converter cover 44 and the engine flex plate (not shown), and hence, providing a means to easily modify the clearances becomes particularly important. As such, drive plates 42 are provided with raised portions 54, i.e., the distance between locating surface 56 and coupling surface 58, which portions may be varied dependant upon the specific requirements of the assembly, including having no raised portions 54. As described supra, this affords a torque converter developer the opportunity to design the converter based on the requirements of fluid dynamics, while still maintaining a simple means to couple the converter between the engine flex plate and the transmission.

A plurality of locations wherein studs 52 may be disposed within drive plates 42 are also shown in these figures. In this embodiment, studs 52 are disposed in first position 60, although studs 52 may similarly be disposed in second and third locations 62 and 64, respectively, dependant on design specifications. This affords a manufacturer of torque converter drive plates the opportunity to merely stamp a single configuration of a drive plate, for example drive plates 42, and provide those drive plates to customers having various stud location requirements.

FIG. 10 depicts studs 52 disposed at first radius 66, wherein first radius 66 is the distance between center of rotation 68 of torque converter 44 and the center of studs 52. Again, as described supra, first radius 66 is derived from the radius of torque converter 44 and the radius of the engine fly wheel (not shown). As each set of vehicle requirements may set forth a unique stud radius, and therefore unique stud locations within drive plates 42, various radii, e.g., first, second and third radii 66, 70 and 72, respectively, are offered in this single embodiment of the instant invention. Similar to other embodiments, height 74 is the distance between locating and coupling surfaces 56 and 58, respectively, of drive plates 42, and as height 74 is the result of the combination of design specifications, e.g., torque converter power or size, and flex plate dimensions, height 74 may vary.

Figure 12:
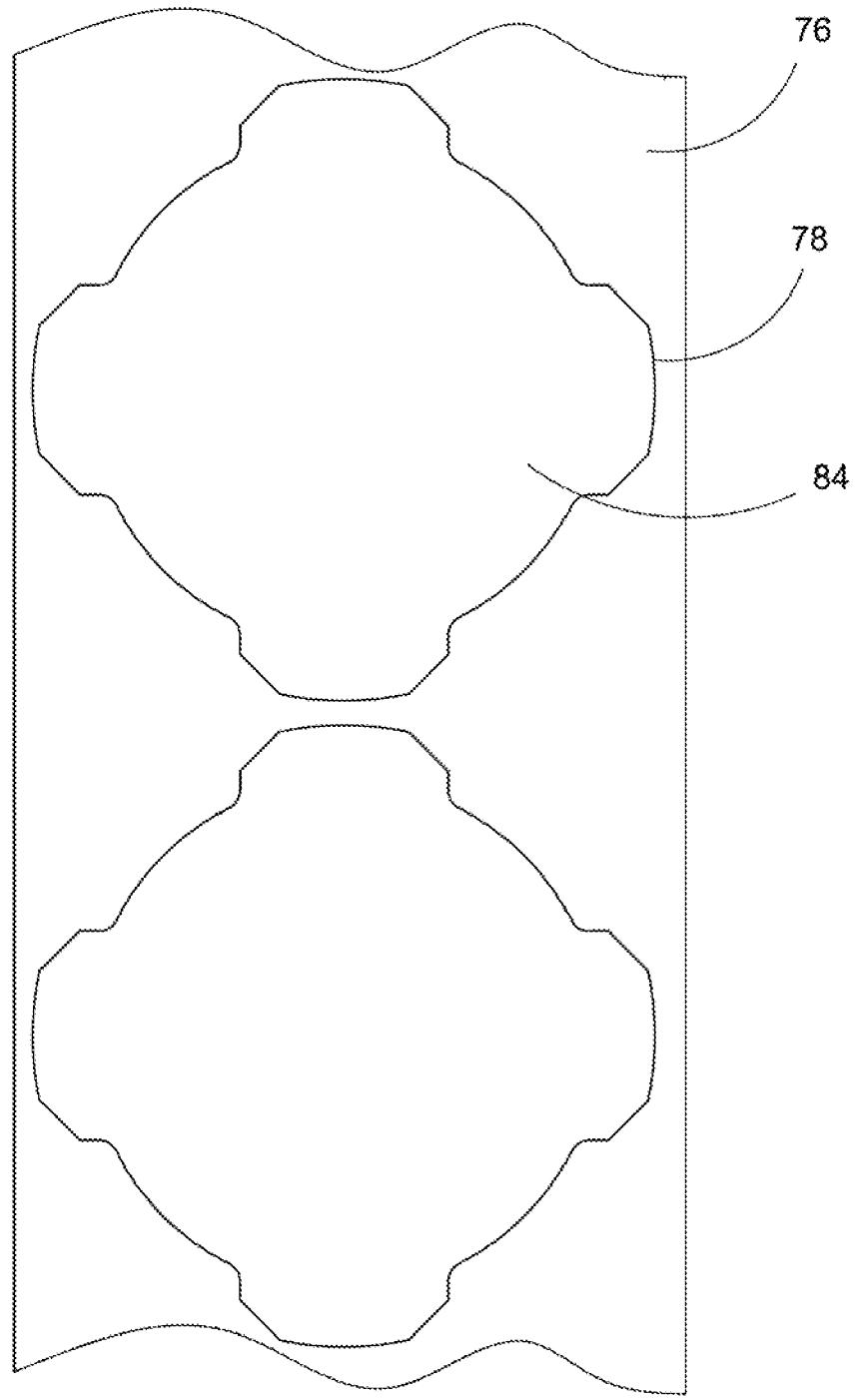
FIG. 12 is a top plan view of a length of metal sheet stock showing a stamping pattern for the torque converter drive plate of FIG. 1.
Figure 13:
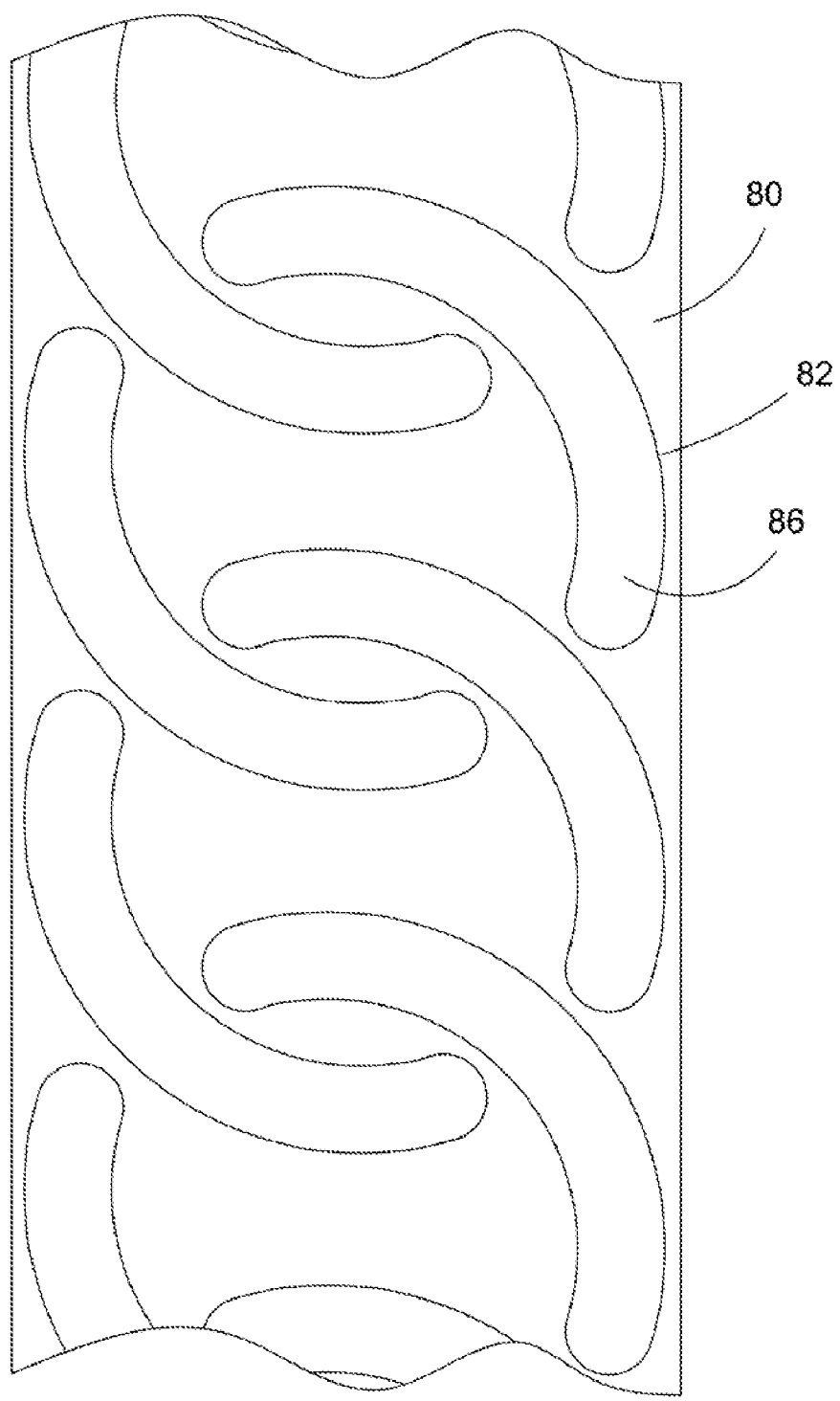
FIG. 13 is a top plan view of a length of metal sheet stock showing a stamping pattern for the torque converter drive plate of FIG. 4; and, FIG. 14 is a front elevational view of a torque converter cover including yet another embodiment of a torque converter drive plate of the present invention.

FIG. 12 shows a top plan view of a length of metal sheet stock 76, depicting stamping pattern 78 for the prior art torque converter drive plate 12 shown in FIGS. 1 through 3, while FIG. 13 shows a top plan view of a length of metal sheet stock 80, depicting stamping pattern 82 for an embodiment of the instant invention, i.e., torque converter drive plate 24 shown in FIGS. 4 through 7. As shown in FIGS. 11 and 12, for a given length of metal sheet stock 76 and 80, respectively, a greater number of torque converter drive plates 24 may be produced than torque converter drive plates 12. Thus, consumed material 84, i.e., the material required to produce a single drive plate 12, is far greater than consumed material 86, i.e., the material required to produce a single drive plate 24. Although two drive plates 24 are required to replace a single drive plate 12, the combination of two consumed materials 86 remains less than a single consumed material 84. Hence, the material required to produce two drive plates 24 is less than the material required to produce one drive plate 12, even when material not used in either plate is included, i.e., scrap material from the stamping process.

Figure 14:
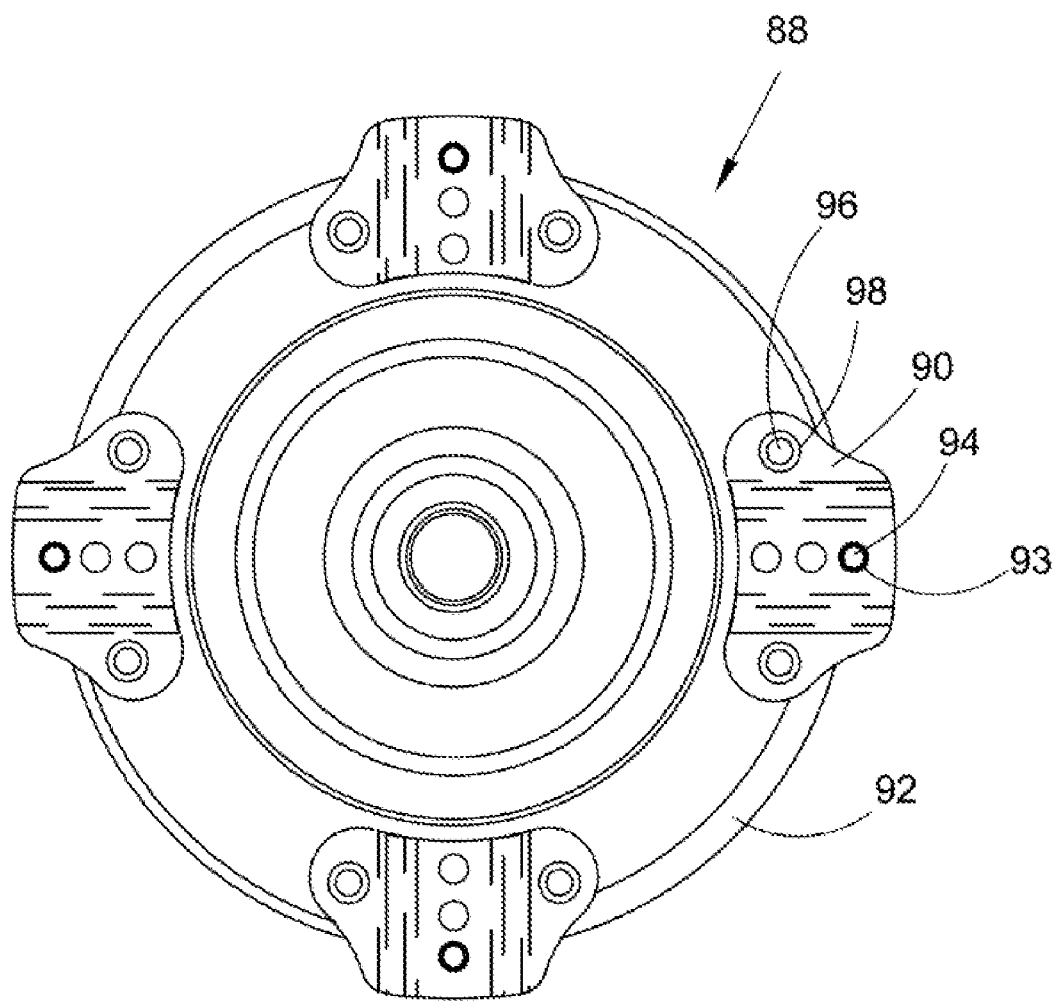

FIG. 14 shows a front elevational view of torque converter cover 88 including yet another embodiment of the instant invention, torque converter drive plates 90. In this embodiment, four drive plates 90 are fixedly secured to cover 92. Thus, each individual drive plate 90 provides a single coupling means, i.e., stud, or bolt, 94, whereby torque converter cover 88 may be fixedly secured to the engine flex plate (not shown). Stud or bolt 94 is inserted Through opening 93. Similar to other embodiments, drive plates 90 also include rivets 96 disposed within holes 98, thereby fixedly securing drive plates 90 to cover 92. Although four drive plates 90 are shown in FIG. 14, one of ordinary skill in the art would appreciate that other numbers of drive plates are also possible, e.g., three or five, and such configurations are within the spirit and scope of the invention as claimed.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed:

1. A hydraulic torque converter, comprising:
   a cover for the hydraulic torque converter;
   a pump for the hydraulic torque converter connected to the cover;
   a turbine for the hydraulic torque converter; and,
   a device for connecting the hydraulic torque converter cover to a flex plate of a drive unit, the device including a plurality of drive plates wherein:
   each drive plate of said plurality of drive plates is non-removably connected to the cover for said hydraulic torque converter by at least two respective circumferentially spaced non-removable fasteners;
   said each drive plate is connected to said flex plate;
   said each drive plate includes respective first and second outer edges curved with respect to a circumferential direction for the cover and circumferentially disposed between the at least two non-removable fasteners, the circumferential direction with respect to an axis of rotation for the torque converter;

the first edge is radially inward of the second edge; and said each plate is axially disposed between the hydraulic torque converter and the flex plate.

2. The hydraulic torque converter of claim 1 wherein each plate of said plurality of drive plates further comprises at least one first opening and at least one second opening, said at least one first opening arranged to receive a first fastener for said cover and said at least one second opening arranged to receive a second fastener for said flex plate.

3. The hydraulic torque converter of claim 2 wherein said at least one first fastener is a rivet.

4. The hydraulic torque converter of claim 3 wherein said rivet is extruded from said cover.

5. The hydraulic torque converter of claim 2 wherein said second fastener is a stud or a bolt.

6. The hydraulic torque converter of claim 2 wherein said at least one first and second openings comprise first and second pluralities of openings, respectively, and wherein the openings in said first plurality of openings are disposed at a first distance from a center of rotation for the torque converter and the openings in said second plurality of openings are at a second distance, different from the first distance, from the center of rotation.

* * * * *